(12) United States Patent
Dauderman et al.

(10) Patent No.: US 10,606,880 B2
(45) Date of Patent: Mar. 31, 2020

(54) INTEGRATED ARCHITECTURE AND NETWORK FOR ARRANGEMENT AND DELIVERY OF MEDIA

(71) Applicant: LIVING MEDIA, LLC, Newport Beach, CA (US)

(72) Inventors: Nicholas J. Dauderman, Newport Beach, CA (US); Tadeusz Peter Matuchniak, Irvine, CA (US); Jeffrey S. Marks, Newport Coast, CA (US); Spyros J Lazaris, Los Angeles, CA (US)

(73) Assignee: LIVING MEDIA, LLC, Newport Beach, CA (US)

( * ) Notice: Subject to any disclaimer, the term of this patent is extended or adjusted under 35 U.S.C. 154(b) by 0 days.

(21) Appl. No.: 15/942,761

(22) Filed: Apr. 2, 2018

(65) Prior Publication Data
US 2018/0225292 A1 Aug. 9, 2018

Related U.S. Application Data

(63) Continuation of application No. 15/419,547, filed on Jan. 30, 2017, now Pat. No. 9,934,225.

(51) Int. Cl.
*G06F 16/44* (2019.01)
*G06F 16/435* (2019.01)
*G06F 16/907* (2019.01)
*G06F 16/951* (2019.01)

(52) U.S. Cl.
CPC .......... *G06F 16/447* (2019.01); *G06F 16/437* (2019.01); *G06F 16/907* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 2002/0092019 | A1* | 7/2002 | Marcus | G11B 27/034 725/37 |
| 2005/0154990 | A1* | 7/2005 | Bodin | G06F 17/211 715/745 |
| 2008/0034056 | A1* | 2/2008 | Renger | H04L 29/06027 709/217 |
| 2009/0106397 | A1* | 4/2009 | O'Keefe | G06F 16/487 709/219 |

(Continued)

*Primary Examiner* — Christopher J Raab
(74) *Attorney, Agent, or Firm* — Lazaris IP

(57) ABSTRACT

A media management framework comprises an integrated architecture and online networking service for aggregating a user's various media files to enable a customized distribution of those media files. User media files are processed, archived, aggregated, and distributed for display in customized story streams. Additional media files are pulled from other sources, such as social media feeds and the public domain, to create a customized distribution and a comprehensive user experience centered on a user's media files based on specified user preferences. The customized distribution also includes modifying story streams based on learning of additional user preferences from continued user interaction and continuously grouping inference associations from one or more of activities, people, objects, times, dates, and locations.

20 Claims, 2 Drawing Sheets

(56) References Cited

U.S. PATENT DOCUMENTS

Figure 1:
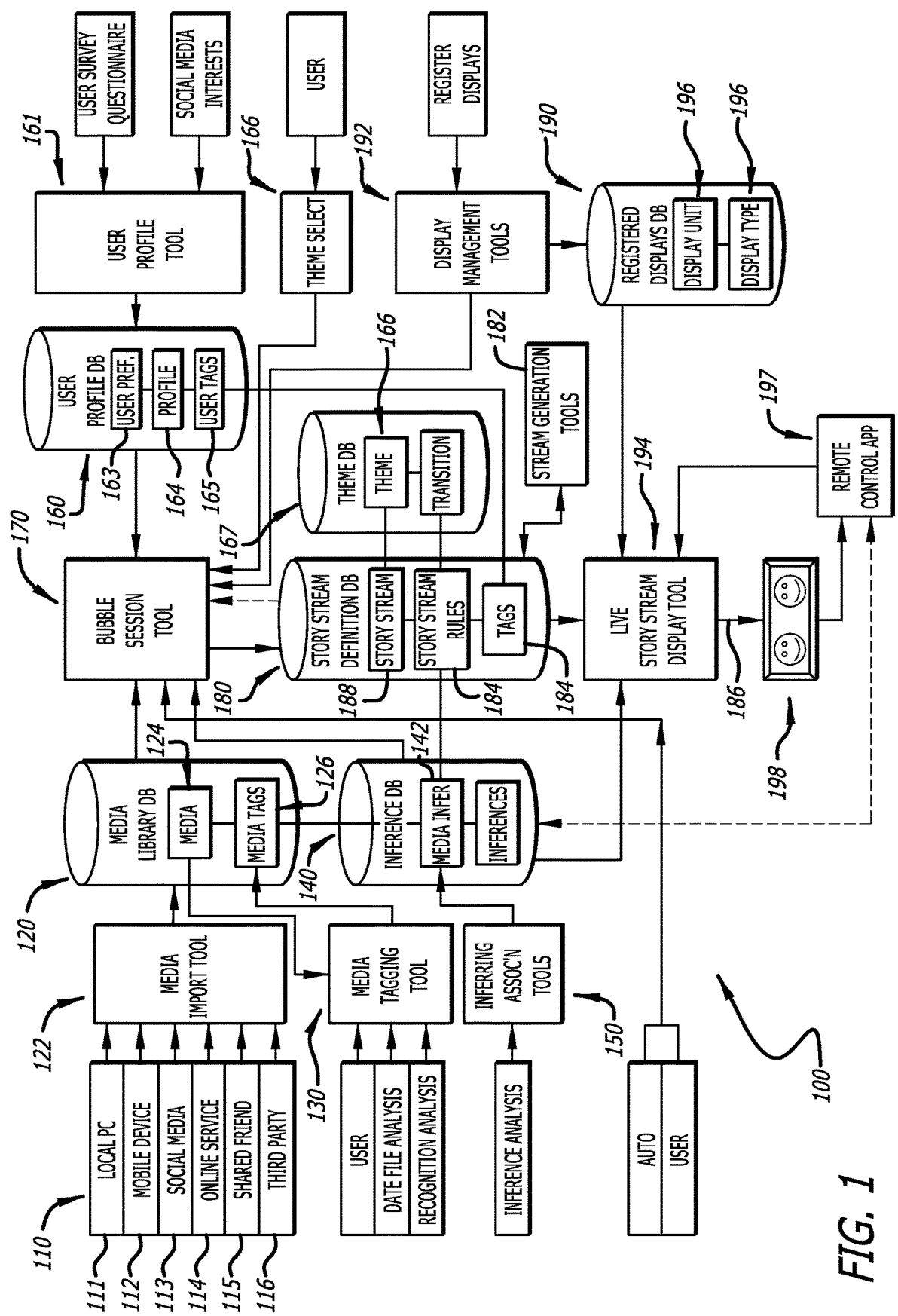

| | | | | |
|---|---|---|---|---|
| 2010/0106852 A1* | 4/2010 | Kindig | .................. | G06F 16/437 |
| | | | | 709/231 |
| 2011/0029565 A1* | 2/2011 | Estevez | .................. | G06Q 30/02 |
| | | | | 707/783 |
| 2011/0246566 A1* | 10/2011 | Kashef | .................. | G06F 16/437 |
| | | | | 709/203 |
| 2013/0073970 A1* | 3/2013 | Piantino | .................. | G06Q 50/01 |
| | | | | 715/738 |
| 2013/0117365 A1* | 5/2013 | Padmanabhan | ......... | H04L 67/10 |
| | | | | 709/204 |
| 2013/0218906 A1* | 8/2013 | Frazier | .................. | G06Q 30/02 |
| | | | | 707/749 |

* cited by examiner

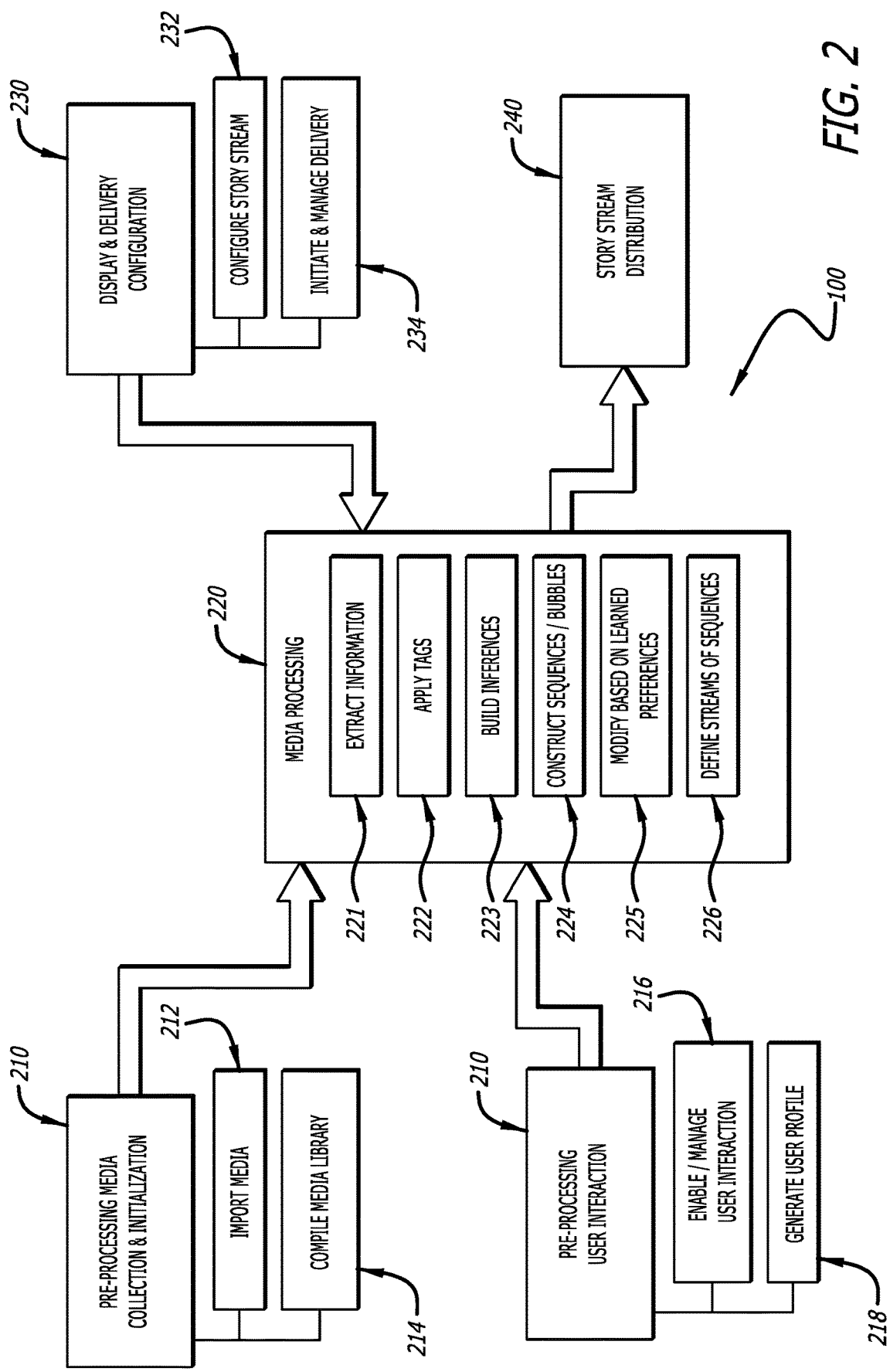

INTEGRATED ARCHITECTURE AND NETWORK FOR ARRANGEMENT AND DELIVERY OF MEDIA

CROSS-REFERENCE TO RELATED PATENT APPLICATIONS

This patent application claims priority to, and is a continuation of, U.S. non-provisional application Ser. No. 15/419,547, filed on Jan. 30, 2017, the contents of which are incorporated in their entirety herein. In accordance with 37 C.F.R. § 1.76, a claim of priority is included in an Application Data Sheet filed concurrently herewith.

INVENTORS

Nicholas J. Dauderman, Tadeusz Peter Matuchniak, Jeffrey S. Marks, Spyros J. Lazaris.

FIELD OF THE INVENTION

The present invention relates to customized infrastructure for processing, aggregation, and distribution of media, tailored to a user's specific needs. Specifically, the present invention relates to an integrated architecture and network that provides a single system of reference with applications that enables users to store, manage and distribute digital and digitized media such as photos, video, and audio. The present invention improves upon existing technological solutions by devising a process which makes use of multiple processing paradigms configured in specific machine implementations to enable advancements in the customized aggregation, distribution, presentation, and storage of user media files. The present invention is provided as a software as a service (SaaS) and is accessible through IP-based networks connected to the Internet or private networks such as those in a home.

BACKGROUND OF THE INVENTION

In today's digitized world, media is being amassed at a nearly exponential pace, as an ever-increasing number of portable communications and media devices empower individuals and organizations to capture life's most precious moments at every turn. Media creation is now easier than ever before, and because of this, the amount of media being collected is now so overwhelming that filtering a highlight account of an event or story without considerable manual effort is untenable. As media collections continue to grow, so does the effort that must be made to keep up with conceptualizing these collections to filter highlight accounts.

Devices with Internet and mobile telephony capability such as cell and satellite phones, personal computers, tablets or other computing devices, and digital picture, audio & video recording devices enable Users to create media in high-quality formats with ease. These same devices also enable Users to quickly accumulate large libraries of media files, as media becomes increasingly easy to create.

This ease of media creation also presents the opportunity to create a large number of media files and large media files in a very short period of time. For example, an individual can capture multiple pictures in split-second intervals—while also at the same time capturing video—guaranteeing that no sound or visual is missed. These large libraries of media remain on the devices or are often transferred to one or more devices for storage and processing. Many individuals have multiple libraries of media residing on storage drives or computers that are independent and fragmented from other large libraries of media on a User's other storage devices. An individual user can have, for example, several hundred gigabytes of digital photos, video and audio on several devices and multiple computers. In many cases, media in such libraries can take up over half of a single computer's drive storage—and Users often store multiple copies of media archives, ultimately confusing and duplicating media in consolidated archives. Additionally, computers, tablets, cameras and phones rarely survive the lifetime of media, and are not ideal for long-term storage of media files. This leads many Users to frustrating ends as the cataloguing and consolidation of large libraries takes time and rarely results in file structures similar to the original file structure. The situation is compounded by the sheer quantity of media files that are growing and overwhelming to the User and are a barrier to their enjoyment.

Social media and photo sharing sites provide an opportunity to share current digital media, but significantly lack the ability to store complete media archives and organize, distribute or share media from such an archive in a personalized or customized manner. Meanwhile, native media management applications installed on computers often require the most advanced and available hard drive speeds, memory and processing power to function. This often leaves Users with older or lower end computers with few options to process media into display formats.

BRIEF SUMMARY OF THE INVENTION

The present invention provides the ultimate single system of reference for, and customized presentation of, digital and digitized media. The present invention enables users to aggregate, archive and display media such as photos, sound clips, video clips, music, and other media files in customized "story" streams. This is accomplished using an intelligent and integrated architecture that creates audio/visual displays by processing media to apply one or more tags to media, and build inferences, construct a set of inference sequences, and generate story streams comprising this media based on the way users define experiences and memories.

The present invention is embodied in one or more systems and methods that present a framework for combining digital media reference and information derived from and/or provided by users, digital media, recognition technology and proprietary algorithms to enliven large and stale media archives on external hard drives, mobile devices, tablets, current and old laptop and desktop computers, and any other such devices. In such a system and method, the framework enables users to simply upload their digital and digitized media and provide answers to an interactive questionnaire. Within a short time, the systems and methods of the present invention generate and deliver story streams for users that are distributed to audio/visual display devices at their direction, in a predictive, dynamic, and automatic process.

Each such display device can therefore be configured to tell its own "fresh" story or multiple stories. The present invention generates story streams that include photos and videos that are based on criteria such as for example people within or not within the photos, the dates the photos were taken, geo-location data, and objects within or not within the photos. Users can then select one or more story streams for display on one or more audio and/or video displays or to share with users via Internet links or other messaging mediums. For example, a display device in the living room of a home can show family photos, whereas rooms for children may have a picture frame dedicated to each child that sleeps there. In one embodiment of the invention, the display device may continue to tell a fresh story by dynamically varying the content to incorporate new media files as they are added to the system, either in real-time or as directed by the user. Similarly, display devices can be updated by dynamically varying the content to incorporate new media files based on special dates like birthdays, anniversaries and holidays.

The "fresh" story is continuously generated, even in the absence of new media content being added. This is because a story stream is based on rules and inferences that, due to their relative nature, result in different media being filtered for display. Given that many people have hundreds of gigabytes of media, it is quite likely that the concept behind the story stream is a causing an ever-changing presentation. For example, a user may apply rules that "only present media that has not been displayed for five days" or "display media that are in sympathy with the weather", so a cloudy day results in cloudy photos or melancholy music. These kind of rules are therefore relative to the media content, rather than absolute, which is often the case with other media presentations or hard-copy photo albums which are fixed by their nature.

As noted above, individuals and organizations alike are able to amass hundreds of gigabytes of media files a year using a myriad of different devices. Such files may be in the form of digital media, analog media, or digitized media from analog or legacy material, such as photos that have been scanned, and it is to be noted that this specification contemplates "media" to mean all of digital, analog, and digitized media files. Regardless, without tools to manage this enormous collection of media, it will remain nothing more than a static and unavailable archive. The present invention enables users to unlock their media archives and dynamically deliver them back with ease across any available display medium in a customized manner.

The present invention is, according to one exemplary embodiment, a media management framework within which one or more of processing, archiving, association, distribution and display of media is performed. In another aspect thereof, the present invention is an online networking service for generating story streams representing a user's media that is processed, archived, associated, distributed and displayed using such an integrated architecture. It is therefore one objective of the present invention to provide a system and method of managing large collections of user media files, and to deliver them in a customized format at the user's direction. It is another objective of the present invention to provide a system and method of aggregating a user's media files to enable this customized delivery of the media files. It is still another objective of the present invention to provide an online service within a distributed computer infrastructure such as a cloud computing environment that forms at least part of an integrated architecture to perform the system and method of aggregating a user's media files to enable a customized distribution of those media files as above. It is yet another objective of the present invention to enable other types of media to be aggregated from other sources, such as social media feeds and the public domain, to create a comprehensive user experience inclusive of their media and publically available media from other online sources, and with customized attributes.

At the outset, several terms used throughout this specification are defined as follows. A "media display mode" is defined as any system, such as a device or distribution channel, having video, audio, or dual audio and video capabilities that is configured to receive or download media content. Each such system may include the ability to cache, download or receive streaming content for rendering on a display, and each media display mode act as a distribution point for story streams. Such systems enable users of the present invention to display photos, video clips and other media on devices such as conventional televisions, HDTVs, computers, tablets, mobile phones, watches and other wearables such as headgear, digital picture frames, browsers, vehicle-based displays and digital displays on appliances such as refrigerators, and to broadcast associated sound bites and music clips. This technology can integrate with proprietary display mediums, or can integrate with third party display mediums. Regardless, it is to be understood that any system, device or channel capable of or configured to receive or download media content may be utilized as a media display mode, and the present invention is therefore not to be limited by any particular system or device referred to herein.

Also, a "media tag" is an identification label for photos, video clips, sound bites and music that are used for sorting, categorizing, searching and creating a story stream. Media tags are data points assigned to user media files to develop associations between them. Algorithms deployed within the present invention are arranged to automatically assign these media tags based on user preferences, which are developed from a recognition analysis, extracted automatically from uploads of user media or from user interaction with the present invention. The present invention also contemplates one or more user interfaces that permit users to manually add media tags to specific media items. Media tags of interest may therefore be inferred based on existing media, such that the present invention operates in the absence of any user preference or profile. For example, as the present invention analyzes media files, certain conclusions may be drawn (such as a large amount of media on July 4th might indicate the user is American and therefore interested in other American holidays, such as Thanksgiving—and tag media and preferences accordingly). A "story stream" is a collection of photos, video clips, sound bites, music and any other types of user media files that intelligently match specific media tag criteria, user preferences and other specified criteria as further set forth herein.

The present invention associates places, times, events, people, and other information points using a combination of user information, media tags, and proprietary algorithms to create a media deliverable in the form of story streams, with chapters that can be delivered to one or more display channels or devices, as noted above. User archives are therefore brought to life by generating these story streams, as well as guiding users through story stream creation to enable a more efficient distribution of user media files. A story stream's format, and the chapters within it, are selectable by the user and deliverable to the media display mode of choice. For example, some media, such as photos, may be delivered to a television in a family room, with selected favorite music files streaming with the story stream. Meanwhile, another chapter of the story stream may be selected and intelligently associated and shared with one's parents in a display channel such as a digital picture frame in their home, such as family pictures from the 1980s.

One significant advancement over existing technological processes allows newly-taken photos to be immediately associated with a story stream, so that the story stream is dynamically updated as user media is created. For example, when newly-taken photos are from a sporting event, the present invention identifies the sport, and the individuals in the photos using a recognition analysis, and the newly-taken photos are immediately delivered for display on selected media display modes.

The many benefits and advantages of such a media management framework become immediately apparent where one considers the massive volume of media that is typically accumulated. For example, if a user were to take 30,000 digital media files (roughly about 10 years of photos), and review and tag each photo (taking only 30 seconds per photo), the user would have to spend 2 hours a night for 125 days just to tag and organize the information to produce an organized library. The user would then have to spend 2 hours a month updating and tagging new photos. This does not take into account the numerous photos and videos received from social media networks or from other connected users. After organizing, the user would need a robust media application to create presentations of media based on criteria the user organized the media with. Independent of the user processing media into a presentation, the process of archiving and organizing media is therefore extremely time-consuming. Also, over time, media will be passed on to next-of-kin and later generations that will use new and more advanced computing devices, operating systems, and other software. For this reason, it makes little sense to organize media on local devices that will be outdated within a few years when media can survive hundreds of years.

Additionally, selecting media files to process and present requires consideration of how to edit, where it will display, and how to deliver the media. For example, one short presentation of a dozen video clips and a dozen photos would have 24 or more transition points that can effectively use multiple sound and visual transitions selected by the user. Such manual editing takes many hours. Once the media presentation is created, users must transfer the presentation or files through storage devices, intranet or internet network links, and also consider the format of the media for the display device. The delivery of the media to displays is also a very manual and time consuming process. Therefore, the options available to the user to process and present media can be as time consuming as aggregating and organizing media archives.

The media management framework of the present invention addresses such issues by providing applications within the integrated architecture and networking service, together with storage and distribution paradigms, to continually leverage the latest distributed computing infrastructure technology, such as "cloud" computing services. With the present invention, users no longer have to spend hours organizing archives, sorting media for specific presentations, editing media display, or searching for ways to convert media for display, or transferring media again and again to the new computer or archive mediums, as this is provided as a cloud-based service. The present invention provides safe, secure and redundant storage using current best practices and storage technologies. Further, because the media management framework utilizes such cloud computing services, applications and interfaces used to access and process, the media can be continually updated to provide users with access to powerful tools via web browsers. Additionally, user interfaces and applications in the present invention use a combination of intelligent information gathering to capture user information, and guide users through processes to upload, identify, organize, and associate media files, as well as to set up, link and distribute media to audio and/or video display devices.

Story streams in the present invention are, as noted above, associations of media organized by one or more tags (e.g. dates, people, events, activities, objects, locations, landmarks, music, etc.) that may be thought of as "sequences" of media forming a story. A user may select a story about a single individual such as a daughter, add an activity such as soccer, and then select an audio/video display such as a picture frame in the daughter's room for streaming the story. The present invention processes the user's archive to generate a story stream of the user's daughter, in this example of a soccer game, and includes music or audio and streams the visual and audio to the display device in the daughter's room.

Users can select different stories to play concurrently or sequentially on single and multiple displays. For example, a user may select one display to show sequences of each family member in the family room while displaying athletic and game events in the game room. Sequences may also include favorite music streams, and sound bites from personal recordings can be integrated into the story stream. The present invention enables users to select stories to share and stream with other users and associated individuals such as family. For example, a user can generate a story stream of a specific event and email a link to the streaming content to a friend, family or group who in turn can distribute the streaming audio visual to their digital display devices. A story stream can also work dynamically in an event or commercial setting where digital media is created and uploaded in near real-time, creating a dynamically updated story stream generated from multiple users. For example, a user can create an event and distribute the link to multiple users attending the event, such as a wedding. During the wedding, all linked users can upload media from the event for immediate display in a story stream.

The present invention applies multiple methods to aggregate and associate media. One such method associates information from metadata in the media files such as the date and time taken and location, information from the user, and from recognition applications to identify events, objects, faces and locations, as well as from proprietary algorithms to filter and organize media archives. For example, where users upload new photos from a basketball game, the present invention identifies the sport and the individuals in the photos, and immediately associates them with a sequence. The present invention then continuously builds inferences from these media tags, and from user profile information, and applies one or more applications to construct sequences, or bubbles, of inferences. Finally, the present invention dynamically updates and displays a tangible representation of the inference sequences as story streams as new media files are uploaded.

The single system of reference for media in the present invention also offers users significant additional benefits over existing technological processes. By hosting media files for users, present invention is able to take what is a highly disorganized and disparate archive of files on multiple devices, in multiple formats and with varying information, and process the archive to create associations for presentation of stories. The present invention further enables users to distribute and share story streams in ways unachievable with a static device-based media archive.

These and other objects, embodiments, features and advantages of the present invention will become apparent from the following description of the embodiments, taken together with the accompanying figures, which illustrate, by way of example, the principles of the present invention.

BRIEF DESCRIPTION OF THE SEVERAL
VIEWS OF THE DRAWINGS

The accompanying drawings, which are incorporated in and constitute a part of this specification, illustrate several embodiments of the invention and together with the description, serve to explain the principles of the invention.

FIG. 1 is a systemic diagram of components in a media management framework according to the present invention; and FIG. 2 is a block diagram of information flow and steps performed within a media management framework according to the present invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Introduction and Explanation of FIGS. 1 and 2

FIG. 1 is a diagram of various components within a media management framework 100 according to the present invention. The media management framework 100 is embodied in an integrated architecture and network that together provide an online service for archiving, processing, distributing, and displaying user media files that is predictive and dynamic. The media management framework is performed within one or more systems and/or methods that includes several components, each of which define distinct activities required to support managing a user's media files and delivering customized streams of those files to the devices or channels of choice.

FIG. 2 is a diagram of steps performed within the media management framework 100 according to the present invention. The steps are performed within several phases that include pre-processing phase 210 involving collection of user media files and user preferences. Media files are organized in a processing phase 220 which is configured to extract information, tag media files, build inferences, construct sequences of those inferences, modify the sequences based on learned user preferences, and define one or more streams of sequences. Finally a post-processing phase 230 is configured to initiate the one or more streams and deliver those to user-specified modes of delivery.

Referring to FIG. 1, the present invention may also be thought of as comprising as a media initialization component, a media processing component, a user interaction component, and a display management component. Together, these components embody the media management framework 100 within the integrated architecture and network that provide an online service for archiving, processing, distributing, and displaying user media files 110.

The media initialization component comprises hardware and software components specifically configured for intake, storage, tagging, and inferring associations of user media 110. All types of user media 110 are ingested into, received by, or otherwise communicated to a media library database 120 using one or more media import tools 122. The media management framework therefore performs initial pre-processing steps of importing media from users, and compiling a media library 124 comprised of all of the user media files 110 provided by or associated with a user.

The user media files 110 may include many different types of files, from many different sources. For example, user media files 110 may include computer-based files 111 such as those stored on user's desktop, laptop, or tablet computer, files 112 stored on a mobile device, whether phone-enabled or otherwise, and cloud-based files 113 such as those stored or maintained with an online service, for example Picasa®, Shutterfly®, or Flickr®. Other types of files include social media files 114 (for example, files maintained via Facebook® or Instagram®), files 115 provided by user contacts, and third party files 116 such as news or mapping services, material in the public domain, or content available by subscription. Examples of such material may include stock photos of a landmark or city, or a satellite photo of a specific location available from Google Maps.

The present invention compiles these files 110 in the database 120. The database 120 may comprise many different database components in disparate locations in many different formats, and therefore it is to be understood that a user's media library 124 may not be located in the same physical storage medium. The database 120 may also store media tags 126, which are created by one or more media tagging tools 130 that are configured to apply a plurality of analyses on user media files 110 that initially categorize each file 110. The media tagging tools 130 may perform a data file analysis, and apply a recognition analysis, to identify, and extract one or more characteristics of a media file 110, in addition to further quantification of information provided by the user. The present invention therefore applies the one or more media tagging tools 130 to a media file 110 in the media library 124, and stores the information extracted from the user media files 110 in the database 120.

The data file analysis of the media tagging tools 130 interrogates user media files 110 to extract whatever information is stored within the file itself. All files have basic information, such as creation date, size, etc. Media files have additional information stored within them, such as for example geo-position/location, exposure in the case of photographs, etc. The data file analysis performs the tasks of storing the raw information (such as date taken, location, exposure), and analyzing that information to ascertain data implicitly (American holiday event, lighting condition indicating a cloudy day, etc.)

A recognition analysis in the media tagging tools 130 extracts that raw information to identify recognizable elements, such as for example a photo with a skyscraper, a video with a soccer ball, an audio clip with intense music. Other media tags 126 and metadata may also be inferred from this raw information.

The media tagging tools 130 are implemented in one or more processors in a computing environment encompassing the media management framework 100. The information extracted from user media files 110, in the form of media tags 126, are output data that are provided as input data to the inferring association tools 150 described below. The inferring association tools 150 are one or more hardware components comprising at least one processor specifically configured to analyze extracted information and generate inferences 142.

The media initialization component also comprises an inference database 140, which is configured to store the inferences 142 generated from the extracted information in the tagged media files 110 by applying the one or more inferring association tools 150. Inferences 142 are drawn from the user media 110 and tags 126 based on an inference analysis performed by the inferring association tools 150. An inference analysis is a process of looking at media tags 126 to determine whether various files among the user media files 110 can be grouped together for subsequent presentation, as described further herein.

The user interaction component comprises hardware and software components and at least one processor specifically configured to collect characteristics 161 representative of user preferences 162 which are stored in a user profile database 160, and apply this as input data to generate a user profile 163 (also stored in the user profile database 160). User preferences 162 are drawn from characteristics 161 provided by the user, for example via a graphical user interface configured to allow the user to interact with the media management framework 100. The user profile database 160 also stores user-provided media tags 164, in which the user selects and provides his or her own tags to categorize media files 110.

A user may also select a theme 166 via the graphical user interface. A theme 166 may be any classification of media files 110 that is desired for presentation, such as a for example a birthday, a party, a vacation, or other event or common attribute that one or more media files 110 include.

User preferences 162 are inferred from characteristics 161 that may be provided either directly by the user, or inferred from the user's habits or interests as indicated on social media platforms. For example, if a user uploads files that are all grouped together on a social media platform such as Pinterest, the present invention may infer one or more preferences based on characteristics according to which they are grouped together.

The inferring association tools 150 are also implemented in one or more processors in a computing environment encompassing the media management framework 100. The inferences 142, together with the user profile 163 and user-provided tags 164, are output data that are provided as input data to the bubble session tools 170 described below. The bubble session tools 170 are one or more hardware components comprising at least one processor specifically configured to process the inferences 142 and generate sequences of inferences 142.

The media database 120, the inference database 140, and the user profile database 160 are coupled to a "bubble" session tool 170 within the media processing component of the present invention. The media processing component comprises hardware and software components specifically configured to organize sequences of inferences 142, which may be thought of as "bubbles", sessions, or sequences of inferences related to user media 110. The media processing component also includes a story stream definition database 180, which includes components configured to determine streams of media files based on the sequences of inferences 142. The story stream definition database 180 communicates with one or more stream generation tools 182 to initialize a stream for delivery to a user's specified display device or delivery channel 198. The story stream definition database 180 includes a database component for maintaining story definitions 188, and the story stream generation tools 182 include at least one specifically configured processor that executes a software application for intelligently processing, filtering, and selecting story definitions 188 to generate a presentation comprising the user media files 110 that together tell the story the user wishes to tell. The stream generation tools 182 are also implemented in one or more processors in the media management framework 100. The sequences of inferences 142, are output data that are provided as input data to the stream generation tools 182 to process the sequences of inferences 142 and generate stream from those sequences. The stream generation tools 182 one or more hardware components comprising at least one processor specifically configured to process the sequences of inferences 142.

Together, the bubble session tool 170 and one or more stream generation tools 182 (together with the stream definition database 180) are responsible for developing streams from sequences of inferences by aggregating media tags 126, inferences 142, themes 166, user preferences 162 and user-provided media tags 166, display characteristics 196, and additional stream rules or tags 184. Themes 166 may be stored in one or more theme database collection 167.

The display management component comprises hardware and software components specifically arranged to configure a stream for delivery and display on a specified device, or over a specified delivery channel 198. The display management component includes a registered displays database 190, a set of display management tools 192, and a live stream display tool 194. The displays database 190 stores display characteristics 196, such as device internet protocol addresses.

The live stream display tool receives 194 instructions to distribute a stream to a specified display device or delivery channel from the stream definition database 180 and associated set of stream generation tools 182, and delivers the stream accordingly. A remote control application 197 may also be included as part of the display management components in an overall system and method for performing the media management framework 100.

Referring to FIG. 2, the pre-processing phase 210 includes the media initialization and user interaction components, and performs the steps of importing 212 user media files 110, compiling 214 the media library 124, enabling and managing 216 user interactions via, for example, a graphical user interface, and generating 218 a user profile 163 from user preferences 162 inferred from the characteristics 161 provided by the user interaction.

The processing phase 220 includes the media processing component, and performs the initial step of assigning media tags by extracting 221 information from, and applying 222 the media tagging tools to, user media files 110 to perform an initial categorization. The processing phase 220 continues with the steps of building 223 inferences from the media tags, constructing 224 sequences (or bubbles) of inferences 142, and applying user preferences and learned preferences based on additional information and subsequent user interaction to modify 225 the inferences 142. The processing phase 220 concludes with the step of defining 226 one or more streams of these bubbles or sequences of inferences 142. The display and delivery configuration phase 230 is a post-processing phase that includes the display management component, which the defined streams are configured 232 and prepared for distribution, and delivery is initiated 234 to user-specified display devices or delivery channels 198.

While it is one embodiment of the present invention that all user media files 110 are hosted and stored in the various database collections of the media management framework 100, it should be noted that the various database components of the present invention may each comprise many different database components in disparate locations and in many different formats within the computing environment, and therefore such components may not be located in the same physical storage medium. Accordingly, it is another embodiment of the present invention that the media management framework 100 is configured to access and pull only those media files 110 from selected media sources authorized by the user or identified as related to user media files 110 (whether it be, for example, the data base on his or her computer, mobile phone, laptop, specific social media accounts, online services, the hard drive on a spouse's computer or a cloud-based drive associated with a spouse, etc.) to compile a story stream 186. Therefore, the present invention may host and store only selected user media files 110.

The processors configured in the media tagging tools 130, inferring association tools 150, the bubble session tool 170, and the user interaction may include processors specifically configured to perform dedicated functions attendant to generating media tags 126, inferences 142, user preferences 162, sequences, additional user preferences, inferred preferences, and story streams 186. For example, global positioning system (GPS) receivers configured to analyze GPS signals transmitted by mobile computing devices, tablet computers, or cameras (or GPS data embedded in file metadata) that transmit and upload user media files 110 may be included among these hardware components. Therefore, in one example of a specifically-configured processor or particular machine implementation, the media management framework 100 may include the capability to automatically identify user locations from user media files 110 that are uploaded, and therefore the data file analyses and recognition analyses applied may operate in conjunction with such GPS receivers to apply geo-location tags to such user media files 110.

Many other specifically-configured processors and particular machine implementations exist within the media management framework 100. For example, the recognition analyses performed herein are configured to identify recognizable elements, such as for example a photo with a skyscraper, a video with a soccer ball, an audio clip with intense music as noted above. A sound file (for example an audio bitstream file, such as a .wav file) that is uploaded among the user media files 110 may be automatically applied to a processor that searches a web-based service for a match with a song title and a particular artist. Where the sound file's metadata includes geo-positioning information, the processor may initiate a search to identify a public event, such as a concert, where the song was recorded by the user.

The present invention provides a comprehensive, end-to-end media experience in an integrated architecture and online networking service that provides a single, cloud-based resource for aggregating and processing all of a user's different types of media, and for customized distribution of media as directed by the user. The architecture enables photos, video files, audio files, and other such media to be uploaded and stored, and also synchronizes all of a user's computing devices (such as desktop, laptop, and tablet computers, mobile phones, and other such mobile or wearable computing devices), social media accounts, and calendars, together with cloud-based computing services. The present invention includes a virtual network concierge in a user profile tool that creates a media profile for each user based at least in part on the user's interaction with the graphical interface, and connects the user's media to the delivery channel of choice, such as a living room HDTV, or a digital picture frame in the office, kitchen or child's room.

The present invention provides users with a simple online registration that links and uploads user archives from their various media devices into a single system of reference to store, organize and distribute digital media. The present invention further synchronizes with devices, applications, social networks and other third-party digital media services to gather media and information that may not reside in archives, further enhancing a single aggregation point and source location for digital media. Registered users then provide profile information through a profile application process. This information is used to process, tag and organize a user's digital media.

The media processing component of the media management framework 100 consolidates and categorizes all user-provided and third party provided media files 110 into a single system of reference. This includes personal media, media accessible on the Internet, social media, media from online services, files from friends, and other third party media accessible to the User.

The media processing component includes the media import tools 122, which act as an interface with media archives and services that form a user's file storage ecosystem, whether they be personal desktops, laptops, tablet computers, phones, cameras, and third-party media and social networks, through APIs. The media import tools 122 are configured to import media and other available information such as interests, music, photos, videos, sound bites and other media, from sources identified by the user, from their various computers and other devices, as well as various public online sources. Imported media 110 is archived by the media management framework 100 via the media import tools 122 and stored in the media library 124, and associated information is imported and used to populate the user profile 164 at least in part. The media import tools 122 may also actively and continuously monitor these sources for new media to be included in the media library 124.

The media management framework 100 includes the multiple tools described herein to associate and categorize user media files 110, in the process of aggregating media, create and edit story streams 186, and distribute those story streams 186 to media display modes 198. Much of the media generated today contains a wealth of information, such as the date taken, the geo-location, people tagged in the images, and so on. The various tools included within the media management framework 100 take this information and combine and process it with other information to assist users with associating, categorizing and maintaining their media archives. The present invention also contemplates applications that enable users to convert or process older, non-digital media such as film, paper photographs, records, and video that are created without the benefit of embedded information in metadata. The present invention is therefore designed to be a single system of reference for all media that can be uploaded and stored.

The media management framework 100 is also designed to enable advanced searches of media archives. Because media files 110 are uploaded and stored on dedicated servers, proprietary processing techniques can be applied to refine media libraries. These same processing techniques enable users to search media archives based on subject or information points that are not provided by the user or in metadata. One embodiment of the present invention provides a user interface that allows the user to search for specific videos, photos, sound bites and other types of media files 110, based on specific search criteria. For example, a user may search for all photos that contain only 2 specific individuals (e.g. two best friends from school), or may search for all photos that include a specific individual and a specific object (e.g. Joey with a soccer ball). Similarly, users may also use the search capabilities of the present invention to exclude specific individuals, objects, or events.

The media tagging tools 130 of the media processing component may include one or more applications responsible for associating specific data points for each media file 110 using various processing techniques. The data points associated with each media file 110 are then used to filter and categorize media files 110 into story streams 186. The data points represent one or more tags 126, and a reference for such tags 126 is maintained in one or more tag reference database collections, and the media tagging tools 130 continually process media files 110 to apply tags 126 and associate files 110 in the media library 124 in conjunction with the one or more tag reference database collections. These applications within the media tagging tools 130 also provide user interface capabilities that allow users to customize and manually tag media files 110 with information such as people, objects, dates, locations, etc.

The media management framework 100 than applies inferring association tools 150 to media files 110 that have been tagged with media tags 126. These tools 150 include one or more applications responsible for applying an inference analysis to the media files 110 and building inferences 142 from the media tags that associate media files 110 together. The inference analysis of the inferring association tools 150 is applied to infer events and interests from raw information collected in the data file analysis and recognition analysis in the media tagging tools 130. For example, raw information may be "lots of photos on July 4th" and "lots of photos of two babies with two adults"—and the inference would be an American family that celebrates American holidays. These inferences 142 are stored in the inference database 140, and are used to construct inference sequences, or "bubbles," in a bubble session tool 170.

The bubble session tool 170 includes one or more applications responsible for generating these sequences, or bubbles, of inferences 142. Inference sequences serve to aggregate associated media files 110 together with themes 166 and user profile 164 data as a preliminary step to generating story streams 186. Extending the example above, "lots of photos on July 4th" and "lots of photos at the end of November", both with the same two adults and children involved, imply an American family celebrating American holidays. This inference may then be connected with themes that involve traditional American music, and apply borders with stars and stripes, etc. Together, the inferences 142 and sequences thereof create the foundation for a story stream 186 that centers around a family enjoying their American holidays.

The media management framework 100 associates information from media tags 126 from users and their various personal computing and mobile devices, from third party users of social media and the respective platforms, from metadata, and using recognition software and proprietary algorithmic processes to generate customized story streams 186. For example, where a birthday event is the subject of a stream 186, the present invention may collect time and location from metadata associated with digital files, associate dates such as birthdays from users, identify individuals in photos and activities displayed therein from social media and using recognition analytics, identify music at the party based on algorithms and applications capable of identifying popular music at the time, and display the media on a device in the room of the individual having the birthday. The present invention uses APIs to link to information from a user's social media pages, and information from other programs such as iTunes®, SoundCloud® or Pandora®. Using proprietary algorithms, the media management framework 100 associates and catalogs all of this media and presents and recommends story streams 186 based on the associated media. During a simple profile process, the user is asked a series of basic questions, such as name, age, anniversaries, etc., that help to automatically generate initial story streams 186 quickly and easily with names like "Birthday Photos", "Family Vacations" or "College Days". Based on user preferences 163, users or the media management framework 100 itself may assign story streams 186 to connected media display modes or share with individuals or groups for streaming display. The result is near real-time gratification and consumption of user media files 110.

Advanced features may also be included, such as associating story stream generation to a calendar event, which dynamically enables the present invention to create story streams 186 for display before, during and after an event, even at the location where it is taking place. For example, a user has a group of friends coming over for dinner. The calendar shows these individuals will be coming to dinner at the user's house—and the media management framework 100 dynamically creates a story stream 186 that contains media such as photos of the invitees, and streams the media to a display device in the dining room during the event. The present invention may include advanced modes that allow the user to combine various rules and algorithms to generate complex and rich story streams 186 (e.g. my two children taken on any Independence Day or any photo with a U.S. Flag). Popular music can also be associated with these story streams 186, so that a popular song from the 1980s plays along with the "College Days" photos from that period. In addition, data on a user's music preferences can be taken from a user's profile, the analysis of a user's iTunes® library, SoundCloud® or Pandora® data, or other such system or application.

The present invention also provides Users with the ability to customize story streams 186 with thematic and stylistic elements. The user interface provides means for entry and integration of stylized headings and other text within the story stream 186. The user interface of the present invention may also be configured to allow the user the option to specify the date of the photo, sound bite, or video clip, in the display of a story stream 186. The present invention also incorporates transitions that enhance the display of the media. Transitions are audio and visual effects that are overlaid and/or inserted among the files or clips that are associated into a story stream 186. The media management framework 100 uses algorithms and associated information to select appropriate transitions and combine media with transitions to create a fluid stream.

There are many available transition elements that are examples of the transitions used, including but not limited to fade, zoom, fly in, sound, text, pictures and provider selected advertisements. The stream generation tools 182 incorporate transitions into the story streams 186 to enhance the viewing and listening experience. Inserting transitions eliminates the very time-consuming tasks of editing media to generate displays. The breath of "transitions" that can be used is nearly limitless, and the methods of incorporating transitions applied with the media management framework 100 automates this transition editing and selecting task. The media management framework 100 associates transitions that are appropriate for the content. For example, for an associated media library of a wedding media, the present invention may select "church bells ringing" as audio as transition and overlay a "lace" foreground at the edges of the display to make the framed stream enhance the visual and audio display experience. In another example, the present invention may associate media of a soccer game and apply transitions that include audio clips of applause, "oohs and ahhs" as well as visual transitions of a soccer ball overlay flying through the transition.

In one embodiment, the present invention may identify unique information from a person's mobile device within a specified distance from a display device which identifies such person, and thereby displays photographs, videos, sound bites or other media, creates a story stream 186, or augments or modifies an existing story stream 186, to include such person or other data or displays which the user has specified should be displayed when such user is within the defined area. In another embodiment, the media management framework 100 may also ask the owner of the network and display(s) to invite the user to share a story stream 186 over the network to a designated display or displays.

The user experience in the present invention is designed to be simple. Online registration occurs through a process that uploads and links media archives from multiple devices and stores it in its current format or a converted format. After registration, the user interacts with the virtual network concierge, which provides a guided "wizard" through which the user answers a series of questions to create a personalized profile. The virtual network concierge may also be configured to provide instruction that helps users input information and connect with the user's audio/video devices, locations, individuals and groups such as living room HDTVs, a digital picture frames, web pages, and devices and delivery channels associated with family and friends. As user media is processed, the present invention may generate and deliver an index and a recommended listing of story streams 186 that can be used to deliver to selected display devices.

The present invention contemplates that many kinds of interfaces with Users are possible. For example, one or more web page may be utilized, as well as applications resident on a "smart" mobile phone or other such mobile device (for example, a tablet computer), to associate display devices with a user's account. Such an application may also be used to take photos for direct import into the media library 124 associated with a user.

Mobile applications may also be used to delete photos and other files being shown on a display 198, using the phone or other such mobile device. Such an application and its associated device may also be used to express preferences, such as a likes or dislikes, when a file is rendered on the display device 198. Additionally, a mobile applications may also allow for uploading and tagging a photo or video to a phone or other mobile device as it is displayed on a third-party display.

It is contemplated that the present invention may also operate without participation of the user in the registration process so that the media management framework 100 works with minimal user input. For example, where a hardware device starts the process of analyzing and tagging user media files (such as a USB/HDMI FOB device which is designed to begin an application that identifies and collects media files 110 on a locally-connected network or hardware), then that device represents the user and de facto user registration, without necessarily requiring users to identify themselves.

As noted above, the user interaction component of the media management framework 100 includes one or more tools 161 that build and maintain a profile 164 about the user, including user preferences 163, and other interests of and information about the user. User profiles 164 may be edited and updated, and administrative privileges may be granted by the user profile tool 161 to allow users access to their media archives or provide access to other users. The present invention contemplates that users may have multiple user access to single and multiple accounts based on requirements to share access to media archives among family members and other user groups. The present invention also gathers and associates information with each user profile 164 based on the user data to enrich media association and processing of story streams 186.

The user profile tool 161 may include one or more applications responsible for gathering information from the user, using various inquiry methods. This may include interactive questioning using audio, voice recognition, text display and online forms to survey users for information that enables the media management framework 100 to associate and aggregate user media files 110 into story streams 186. Initially, users may be queried with survey questions about various interests and hobbies. Such surveys may be dynamic, such that each follow-up question may change based upon the previous response (e.g. responding positively to a question about sports, the user is then asked which sports they are most interested in). Such surveys are intended to be fun and engaging for the user, but also effective in gaining insight into user preferences 163.

In addition, the user profile tool 161 imports information such as interests and hobbies from any social media site or account that the user has linked through APIs developed with such external information sources. The user profile tool 161 may also pull information from public sources based on the user profile 164 or on other factors. The user profile tool 161 may also pull information about music and other preferences from iTunes® libraries, SoundCloud® accounts, Pandora® data files, or any other such service or site associated with a user. The present invention may also survey users at future intervals to update user profiles 164 and either confirm information validity.

As a user provides information to the media management framework 100, the user profile applications of the user profile tool 161 populate one or more database collections used for processing, associating and aggregating the user media files 110. For example, metadata provides information such as date and location, but user-provided information may provide data on specific events or activities such as birthdays, anniversaries or activities such as baseball that are stored as user-provided media tags 165. The present invention associates dates from metadata with this user-provided media tag 165 information (such as a birthday) and where possible uses recognition technology to identify activities in a media file 110. This enables the media management framework 100 to associate media files 110 from times and activities that may have occurred over multiple years. The user profile tool 161 and its applications therefore act as a filter for media files 110 and provide critical information to enable story stream generation.

The present invention contemplates that user media files may be distributed, shared, and/or delivered to, many different types of devices, channels, and modes as noted throughout. One embodiment of the invention includes a process of distributing and delivering story streams 186 over networks for display in formats compatible with most third party digital displays. Examples of such displays include digital picture frames, digital monitors, TVs, personal computers, mobile devices and other hardware, including mainstream devices such as Apple TV or Google Chromecast®, and wearable computing devices, such as headgear/headsets such electronic eyeglasses/eyewear and virtual or augmented reality headsets for use in video games, helmets, wristwatches, wristwatch computers, hearing aids and audio devices. In another embodiment, the present invention includes a process to distribute and deliver story streams 186 to displays specifically designed to receive media generated over a specific network. In this embodiment, displays may each contain chips, bar codes or applications that enable users of the present invention to easily identify, register and connect with the device over the specific network. The present invention also contemplates, in one or more additional embodiments, distribution to devices that enable users to change story streams 186 dynamically, much like one might change a channel on a television with a remote or select a different radio station.

Each display device may also be identified and provided with a label that can be further customized by the user using the graphical user interface, such as for "Family Room", "Johnny's Room", "College Memories", "Facebook Photos", etc. Users then can assign story streams 186 to displays as well as specify the timing and/or sequence that one or more story streams 186 may display on devices. Each media device connected to the present invention then receives streaming audio/video of user story streams 186 from the user's archive or other story streams 186 that have been shared. The present invention constantly processes and updates a user's information and media associations to improve story streams 186 and include media from the past, as well as the present.

The display management component and stream distribution phase 240 include, as noted above, one or more display management tools 192 and a live display tool 194. These tools may also include one or more applications responsible for consolidating and categorizing all user-provided and third party provided media into a single system of reference for distribution as a story stream 186. The registered displays database 190 maintains the display characteristics 196 of all display units and types that are available for displaying media in story streams 186, such as user-specified computing devices, phones, tablets, televisions, picture frames, and wearable computing devices, etc. The display management tools 192 and live display tool 194 use the display characteristics 196 stored in the registered displays database 190, for example, to determine the appropriate output format of the story stream 186 for a display type, such as the resolution and bit-rate, etc.

The stream distribution phase 240 may also include the remote control application 197, which is a component responsible for managing the remote control function of the media management framework 100, in conjunction with the display management tools 192, live stream display tool 194, and display device or delivery channel 198. The remote control application 197 includes one or more remote control management tools that consolidate and categorize all remote devices into a single system of reference. This includes personal computers, laptops, smartphones, tablets, phablets, and other third party hardware devices or software applications that may act as a remote control. A remote control registration tool allows users to register control functionality and devices, and maintains all remote controls that are available for controlling the media displayed in story streams 186 (such as playback control, editing and deleting media, etc.) as well as ranking media currently displayed (e.g. thumbs up or thumbs down function) to cause effect in future media content displayed by influencing the algorithms used in the story stream definition process. Remote control registrations are saved to a remote control database, and each remote control is classified by a remote type which determines interaction capabilities with a display unit.

The remote control application 197 also includes tools that enable the user or the viewer to affect the story stream display experience by controlling the playback via typical controls (such as pause, rewind, forward-wind, speed-up, slow-down, volume change, mute, etc.) as well as influencing the rules used for story stream generation (such as ranking media currently displayed, via a thumbs up/down or 5-star ranking paradigm). One example of remote control functionality in the present invention includes enabling media from other story streams 186, or even from other contacts or associates that have shared their media libraries or story streams 186, to be pulled into a story stream 186 being viewed. Accordingly, the remote control application 197 is capable of communicating with the story stream generator and database 180 to modify story streams 186. The modifications provided via the remote control application 197 may also be considered as continued user interaction and are stored within the present invention to modify user preferences 163 as part of the process of learning additional user preferences.

The stream generation tools 182 include one or more applications that analyze and compare tags between the user profile 164 and media files 110 available to the user in order to create a story definition 188. Story definitions 188 are stored in a stream definition database 180 and are used to select media 110 and transitions for rendering with media device modes. The stream generation tools 182 also define story streams 186 that need not depend directly on user input, although one aspect of this process is to enable users to verify the resulting story stream 186 and adjust the processes, algorithms and operational rules the media management framework 100 uses to organize, edit and display the story stream 186. The present invention applies these processes, algorithms and operational rules along with information derived from the user profile 164 to associate and filter the user's available media. The stream generation tools 182 minimize, and may even eliminate, the need for the user to review and select digital media for any given story stream 186. Regardless, the present invention may also provide advanced levels of operation that enables users to change or influence the creation of a story stream 186 directly. The stream generation tools 182 are configured to learn user preferences 163, and as the user interacts with the present invention and/or manually refines completed story streams 186, these applications remember nuances such as media deleted from story streams 186 and the arrangement, time interval, and display preferences the user applies most often, as well as continually monitoring user interests that may be determined from interfacing with social media networks, etc. In this manner, the stream generation tools 182 are able to "learn" additional user preferences 163 and associations of inferences groupings to modify sequences of inferences 142 and create additional stream rules or tags 184 that are then used to adjust story streams 186.

Learning user preferences 163 and associations of inference groupings, and modification of sequences of inferences 142, may occur any time the user interacts with the media management framework 100, where it is possible to infer something about their preferences in general as well as specific to a story stream 186. For example, if a user selects the "pause" button on a remote control enough times when a certain person is involved in the photo, the present invention infers that the person in question is of greater value than previously determined (if at all). Also, the manner in which the user interacts with the media management framework 100 may be analyzed differently depending on which user interface is being used and for what purposes (e.g. viewing an existing story stream 186, versus modifying the rules for a new story stream 186).

User preferences 163, and the user profile 164, may be weighted as further user interactions are experienced. Therefore, the processing of learning in the present invention and modifying inferences 142 therefrom, is improved by determining what users prefer as story streams 186 are being generated. Weights may be applied in many different manners, depending on other factors extracted from data file and recognition analyses, and from the characteristics identified by the user.

One machine implementation of the learning of user preferences 163 includes one or more artificial intelligence techniques designed to model user preferences 163. This may include one or more logic components designed to improve over time due by learning as new data about the user and extracted from the media files 110 is accumulated within the media management framework 100. The logic components may perform "fuzzy" processing techniques that apply approximations based on the user interaction and data extracted from the media files 110.

The display management tools 192 and live stream display tool 194 include, as noted above, one or more applications that are responsible for assigning story streams 186 to media display modes 198, or to be shared with other users. The one or more applications in a display admin application which provides users with the ability to set up and connect with display devices, assign names and categories to display devices, and select story streams 186 to display on those devices at various intervals and sequences. The media management framework 100 may also include an application which processes and associates user media files 110 into an audio/video stream or file designed for optimal display on the targeted media display mode 198, and also distributes the assigned story streams 186 to assigned media devices 198. Such an application continually checks with the stream generation tools 182 for updates to story streams 186 assigned to media display devices 198, such that changes to the rules or new media files 110 and related associations can be added to story streams 186 on an on-going basis. This results in a dynamic display on the selected media display mode 198, and therefore it is always in flux, more engaging, and likely to continue to surprise the viewer.

Multiple story streams 186 may be associated with one or more media display devices 198 (such as picture frames, personal computers, television screens, etc.) such that only the media 110 that corresponds to those story streams 186 are displayed on the appropriate display device 198. For example, a family room may have one display device 198 that shows the "Family Story", whereas each child's room has a display device 198 dedicated to their own photos respectively; and the study may have a display device 198 dedicated to the "College Days". An older family member, for example a grandmother, may also have a display device 198 that includes a story stream 186 of all her grandchildren based on shared user accounts throughout her family.

The live stream display tool 194 therefore is responsible for preparing a story stream 186 for presentation on a media display device 198. Taking the story stream 186 defined by the output instruction from stream generation tools 182, the live stream display tool 194 pulls media files from the media library 124 and applies one or more themes 166 from the themes database 167. The live story display tool 194 also analyzes rules from the "bubble" session tool 170, media tags 126, user-provided media tags 165, and information in the user profile 164. The live story display tool 194 also pulls display characteristics from the registered displays database 190, and any information from the remote control application 197. In this manner, a sequence of inferences in a story stream 186 is configured based on the selected display modes 198, and initiated for distribution thereto.

It is to be understood that many embodiments are possible and are within the scope of the present invention. For example, user credentials may be applied to an apparatus that accesses the media management framework 100 from a remote device. In such an example, a user may have credentials associated with an apparatus such as a USB dongle, and can insert such apparatus in a display device 198 such as television when visiting a friend's home to display story streams 186 on the display device 198. In such an example, the story stream 186 would not be accessible by the owner of the display device 198 once the credentialed apparatus is removed.

In another embodiment, a user may have the ability, using a mobile phone or other device, to select a photo when viewing story streams 186 on someone else's display device 198 for delivery to himself or herself. In such an example, if a wireless network (such as Wi-Fi) can identify a user in another person's home, then story streams 186 (and by extension, media files 110) can be delivery to that user. Users may also be able to identify bulk files or percentages of files to be delivered, such as for example "I want all of Nick's photos from Peter's wedding." Users may also be able to assign links or IP addresses of display devices 198 to other users, and those users can then send the files 110 (such as photos taken at a wedding) directly from the other user to the display devices 198.

In another embodiment, an apparatus such as a USB flash or jump drive, or key fob, which is insertable into a computing device such as a laptop or desktop, may include software which automatically installs on the computing device for configuring access to the media management framework 100. Such software allows a user to sign up and create an account, and enables access to local photos on a hard drive within the computing device. Such software may also requests permission to access to social media accounts affiliated with the user. Therefore, network access for the present invention may be configured on an apparatus that is provided directly to users for installation on their personal devices.

Users may also be able to take such an apparatus and insert into a local device such as TV screen, for example using an HDMI port. The apparatus configures an application to operate on the local device. The apparatus may include credentials which allow the user to access his or her account, and access their media library 124 from the local device. The apparatus may also include software for wireless communication with other computing devices and for accessing social media accounts.

Users may further be provided with a "freeze" option which allows them to capture dynamic portions of a story stream and carry out tasks such as burning them to a disk, saving them to a USB drive, or sharing them with other users, such as via social media accounts.

As noted above, it is contemplated that the systems and methods comprising the media management framework 100 may be implemented using distributed computing infrastructure technologies such as "cloud" computing services. However, it is to be understood that the integrated architecture and online networking service according to the present invention may be further implemented in many different computing environments generally. For example, they may be implemented in conjunction with one or more special purpose computers, programmed microprocessors or microcontrollers and peripheral integrated circuit element(s), an ASIC or other integrated circuits, digital signal processor(s), electronic or logic circuitry such as discrete element circuits, programmable logic devices or gate arrays such as a PLD, PLA, FPGA, PAL, and any comparable means. In general, any means of implementing the systems and method illustrated herein can be used to implement the various aspects of the present invention. Exemplary hardware that may be utilized in one or more embodiments or aspects of the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the systems and methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of dynamic, user-directed arrangement and delivery of media, comprising:
   within a computing environment comprised of at least one computer processor, and at least one computer-readable storage medium operably coupled to the at least one computer processor, the at least one computer processor operable to execute a plurality of program instructions to perform the steps of:
   receiving one or more media files designated by at least one user, or at the direction of the at least one user;
   identifying one or more variables relative to a display environment of the one or more media files, for dynamically influencing an interactive index for selecting the one or more media files for display of at least one media stream without user interaction the one or more variables including at least one of a social setting, a time, and an audience of the display environment;
   applying one or more artificial intelligence techniques to adaptively relate the one or more media files in the interactive index by continually updating the interactive index with characteristics learned from relating the one or more variables with the one or more media files, user interactions, user preferences, and inferences obtained from relating the characteristics learned as the interactive index is updated, by 1) developing a set of content rules for framing a content boundary, where the set of content rules determine the selection, arrangement and delivery of the one or more media files, and 2) determining a user affinity for the one or more media files and third party content based on the content boundary, 3) generating the at least one media stream comprised at least of selected media files for delivery to the display environment, 4) identifying changes to the at least one media stream, based on the display environment and on user activity that is not directly related to the at least one media file or the display, 5) dynamically modifying the at least one media stream in real time so that content of the at least one media stream changes in response to the one or more variables, and 6) relating the at least one media stream with one or more of a) a user interaction and a recipient interaction with the at least one media stream, b) additional inferences obtained from the user affinity, c) data obtained from one or more personal computing devices associated with a user or a recipient, and d) audio instructions by the user or recipient, to further dynamically modify the at least one media stream in real time, for direct control by the at least one user as the one or more media files and the third party content are received; and updating one or more linked social media networks designated by credentials assigned by the at least one user with selected ones of the one or more media files and the third party content.

2. The method of claim 1, further comprising relating the at least one media stream with additional content that includes variables representing data and media associated with and obtained from user social media accounts, user contacts, networked sources that include the one or more personal computing devices associated with the at least one user or an account of the at least one user, external servers, and web sources that include one or more of Internet-based services, information media resources, and other networked services.

3. The method of claim 1, further comprising initiating the delivery of the at least one media stream to the one or more devices designated by the credentials assigned by the user, based on the interactive index and the content boundary.

4. The method of claim 1, further comprising assigning specific content to at least one specific device in the one or more devices associated with credentials assigned by the at least one user, or to a specific location of a device in the one or more devices associated with credentials assigned by the at least one user.

5. The method of claim 1, further comprising applying a template to frame an initial content boundary for the at least one media stream.

6. The method of claim 1, further comprising identifying at least one of a geo-location of the least one user to retrieve the third party content and additional content that is relative to the geo-location of the at least one user, and a geo-location of at least one device associated with credentials assigned by the at least one user to retrieve the third party content and additional content that is relative to the geo-location of the at least one device.

7. The method of claim 1, further comprising requesting further media files from one or more additional users, and relating the at least one media stream with the further media files.

8. The method of claim 1, wherein the one or more devices designated by credentials assigned by the at least one user is an internet-enabled display device.

9. The method of claim 8, wherein the internet-enabled display device is one or more of a television, a computer, a screen, a mobile telephony device, a picture frame, or a networked device configured to receive data over a network.

10. A system of dynamic, user-directed arrangement and delivery of media comprising:

a computing environment including at least one non-transitory computer-readable storage medium having program instructions stored therein and at least one computer processor operable to execute the program instructions to execute a plurality of data processing modules, the plurality of data processing modules including:

a media import module embodied in at least one processor, specifically configured to receive one or more media files designated by at least one user, or at the direction of the at least one user;

a tool configured to identify one or more variables relative to a display environment of the one or more media files, for dynamically influencing an interactive index for selecting the one or more media files for display of at least one media stream without user interaction the one or more variables including at least one of a social setting, a time, and an audience of the display environment;

an artificial intelligence module embodied in at least one processor, specifically configured to adaptively relate the one or more media files in the interactive index by continually updating the interactive index with characteristics learned from relating the one or more variables with the one or more media files, user interactions, user preferences, and inferences obtained from relating the characteristics learned as the interactive index is continually updated, by developing a set of content rules for framing a content boundary, where the set of content rules determine the selection, arrangement and delivery of the one or more media files, determining a user affinity for the one or more media files and third party content based on the content boundary, generating the at least one media stream comprised at least of selected media files for delivery to the display environment, identifying changes to the at least one media stream, based on the display environment and on user activity that is not directly related to the at least one media file or the display, dynamically modifying the at least one media stream in real time so that content of the at least one media stream changes in response to the one or more variables, and relating the at least one media stream with one or more of a) a user interaction and a recipient interaction with the at least one media stream, b) additional inferences obtained from the user affinity, c) data obtained from one or more personal computing devices associated with a user or a recipient, and d) audio instructions by the user or recipient, to further dynamically modify the at least one media stream in real time, for direct control by the at least one user as the one or more media files and the third party content are received; and a module embodied in at least one processor, specifically configured to update one or more linked social media networks designated by credentials assigned by the at least one user with selected ones of the one or more media files and the third party content.

11. The system of claim 10, wherein the at least one media stream is related with additional content that includes variables representing data and media associated with and obtained from user social media accounts, user contacts, networked sources that include the one or more personal computing devices associated with the at least one user or an account of the at least one user, external servers, and web sources that include one or more of Internet-based services, information media resources, and other networked services.

12. The system of claim 10, wherein specific content is assigned to at least one specific device in the one or more devices associated with credentials assigned by the at least one user, or to a specific location of a device in the one or more devices associated with credentials assigned by the at least one user.

13. The system of claim 10, wherein the artificial intelligence module is further configured to apply a template to frame an initial content boundary for the at least one media stream.

14. The system of claim 10, wherein the artificial intelligence module is further configured to identify at least one of a geo-location of the least one user to retrieve the third party content and additional content that is relative to the geo-location of the at least one user, and a geo-location of at least one device associated with credentials assigned by the at least one user to retrieve the third party content and additional content that is relative to the geo-location of the at least one device.

15. The system of claim 10, wherein the artificial intelligence module is further configured to request further media files from one or more additional users, and relating the at least one media stream with the further media files.

16. The system of claim 10, wherein the one or more devices designated by credentials assigned by the at least one user is an internet-enabled display device.

17. The system of claim 16, wherein the internet-enabled display device is one or more of a television, a computer, a screen, a mobile telephony device, a picture frame, or a networked device configured to receive data over a network.

18. A method of dynamic, user-directed arrangement and delivery of media, comprising:
  arranging a plurality of content designated by at least one user, at the direction of the at least one user, or from another user associated with the at least one user, for delivery in at least one media stream, by
    identifying one or more variables relative to a display environment of the plurality of content, for dynamically influencing an interactive index for selecting one or more media files in the plurality of content for display in the at least one media stream without user interaction the one or more variables including at least one of a social setting, a time, and an audience of the display environment;
    adaptively relating the one or more media files in the interactive index by continually updating the interactive index with characteristics learned from relating the one or more variables with the one or more media files, user interactions, user preferences, and inferences obtained from relating the characteristics learned as the interactive index is updated, developing a set of content rules for framing a content boundary, where the set of content rules determine the selection, arrangement and delivery of the one or more media files, determining a user affinity for the one or more media files and third party content based on the content boundary, generating the at least one media stream comprised at least of selected media files for delivery to the display environment, identifying changes to the at least one media stream, based on the display environment and user activity that is not directly related to the at least one media file or the display, dynamically modifying the at least one media stream in real time so that content of the at least one media stream changes in response to the one or more variables, and relating the at least one media stream with one or more of a) a user interaction and a recipient interaction with the at least one media stream, b) additional inferences obtained from the user affinity, c) data obtained from one or more personal computing devices associated with a user or a recipient, and d) audio instructions by the user or recipient, to further dynamically modify the at least one media stream in real time, for direct control by the at least one user as the one or more media files and the third party content are received; and
  updating one or more linked social media networks designated by credentials assigned by the at least one user with selected ones of the one or more media files and the third party content.

19. The method of claim 18, further comprising identifying at least one of a geo-location of the least one user to retrieve the third party content and additional content that is relative to the geo-location of the at least one user, and a geo-location of at least one device associated with credentials assigned by the at least one user to retrieve the third party content and additional content that is relative to the geo-location of the at least one device.

20. The method of claim 18, further comprising requesting further media files from one or more additional users, and relating the at least one media stream with the further media files.

* * * * *